(12) United States Patent
Williams

(10) Patent No.: US 9,440,614 B2
(45) Date of Patent: Sep. 13, 2016

(54) AIRBAG MODULE ASSEMBLY WITH CROSS-CAR GAS DIFFUSION

(71) Applicant: Jeffrey D. Williams, Roy, UT (US)

(72) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/610,523

(22) Filed: Jan. 30, 2015

(65) Prior Publication Data

US 2016/0221530 A1    Aug. 4, 2016

(51) Int. Cl.
*B60R 21/26* (2011.01)
*B60R 21/264* (2006.01)
*B60R 21/261* (2011.01)

(52) U.S. Cl.
CPC .......... *B60R 21/264* (2013.01); *B60R 21/261* (2013.01); *B60R 2021/2612* (2013.01); *B60R 2021/26076* (2013.01)

(58) Field of Classification Search
CPC .............. B60R 21/261; B60R 21/264; B60R 2021/2612; B60R 2021/26076; B60R 2021/26094
See application file for complete search history.

(56) References Cited

U.S. PATENT DOCUMENTS

| | | | | |
|---|---|---|---|---|
| 5,269,561 A * | 12/1993 | Davis | ........................ | F42B 3/04 280/736 |
| 5,332,256 A * | 7/1994 | Lauritzen | .............. | B60R 21/201 280/728.2 |
| 5,509,686 A | 4/1996 | Shepherd et al. | | |
| 5,762,360 A * | 6/1998 | Damman | ............... | B60R 21/217 280/728.2 |
| 5,860,672 A | 1/1999 | Petersen | | |
| 5,871,228 A * | 2/1999 | Lindsey | .............. | B60R 21/2644 280/728.2 |
| 5,931,489 A * | 8/1999 | Damman | ............ | B60R 21/2171 280/728.2 |
| 6,032,979 A | 3/2000 | Mossi et al. | | |
| 6,089,600 A * | 7/2000 | Schenck | ................ | B60R 21/217 280/740 |
| 6,113,134 A * | 9/2000 | Lim | ....................... | B60R 21/217 180/282 |
| 6,382,662 B1 | 5/2002 | Igawa | | |
| 6,679,518 B2 * | 1/2004 | Varcus | ................ | B60R 21/2037 280/728.2 |
| 6,702,318 B2 | 3/2004 | Rose et al. | | |
| 6,935,653 B2 * | 8/2005 | Koh | ....................... | B60R 21/261 280/728.2 |
| 7,121,576 B2 | 10/2006 | DePottey et al. | | |
| 7,431,327 B2 * | 10/2008 | Kretzschmar | ........ | B60R 21/2171 280/728.2 |
| 7,559,574 B2 * | 7/2009 | Magoley | .................. | B60R 21/26 280/736 |
| 7,823,920 B1 * | 11/2010 | Burghardt | ............. | B60R 21/203 280/731 |
| 7,926,837 B2 * | 4/2011 | Harvey | ................ | B60R 21/2035 280/728.2 |
| 8,602,452 B1 | 12/2013 | VanHooser et al. | | |
| 8,894,096 B2 | 11/2014 | Fischer | | |
| 2006/0261583 A1 * | 11/2006 | Debler | ................... | B60R 21/276 280/740 |
| 2011/0148083 A1 | 6/2011 | Paxton et al. | | |
| 2013/0112102 A1 | 5/2013 | Arnold | | |
| 2015/0307050 A1 * | 10/2015 | Smith | .................... | B60R 21/217 280/728.2 |

FOREIGN PATENT DOCUMENTS

EP          0800965 A2 * 10/1997  .......... B60R 21/272
WO    WO 2009/136827    11/2009

* cited by examiner

*Primary Examiner* — James English
(74) *Attorney, Agent, or Firm* — Pauley Erickson & Kottis

(57) ABSTRACT

An airbag module assembly includes a module housing that defines a storage chamber. A thrust neutral inflator device is at least in part disposed within the storage chamber. The inflator device releases airbag inflation gas within the storage chamber in a cross-car manner. In specific embodiments, the cross-car release of the airbag inflation gas involves substantially all the airbag inflation gas being released at an angle of no more than ±60° and preferably at an angle of no more than ±50° from horizontal when viewed in a top planar view of the inflator device disposed within the housing.

18 Claims, 8 Drawing Sheets

AIRBAG MODULE ASSEMBLY WITH CROSS-CAR GAS DIFFUSION

BACKGROUND OF THE INVENTION

1. Field of the Invention

This invention relates generally to inflatable vehicular safety restraint assemblies such as airbag installations for automotive vehicles and, more particularly, to inflatable vehicular safety restraint assemblies that discharge or provide inflation gas to an airbag cushion in a cross-car manner.

2. Discussion of Related Art

It is well known to protect a vehicle occupant by means of safety restraint systems which self-actuate from an undeployed or static state to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushion(s) may desirably deploy into one or more locations within the vehicle between the occupant and certain parts of the vehicle interior, such as the doors, steering wheel, dashboard or the like, to prevent or avoid the occupant from forcibly striking such parts of the vehicle interior.

Various types or forms of such passive restraint assemblies have been developed or tailored to provide desired vehicle occupant protection based on either or both the position or placement of the occupant within the vehicle and the direction or nature of the vehicle collision. Automotive passenger side airbag installations generally incorporate an airbag module assembly having an inflator device within a module housing or canister and an inflatable airbag cushion adapted to inflate out a side of the module housing. In one currently used passenger side airbag module assembly configuration the inflatable airbag cushion is adapted to inflate out a top side of the module canister, often referred to as a "top mounted" airbag cushion. Such a module assembly is installed in the dashboard of the automobile close to the windshield. Upon activation, the inflator device releases inflation gas which inflates the airbag cushion. The top mounted airbag cushion initially inflates toward the windshield and then rapidly rolls down the dashboard in a direction toward the passenger.

One common form of inflator device stores or contains a pyrotechnic, propellant or other type of gas generant material which, upon actuation of the device, ignites or reacts to rapidly form or produce large volumes of inflation gas used to inflate an associated airbag cushion to protect vehicle occupants.

As will be appreciated, the manufacture of such reactant gas generant material-containing inflator devices necessitate the taking of special care, not only during the manufacturing process but also during subsequent storage, handling, shipping and transportation, for example, to ensure avoidance of inadvertent ignition or reaction of the gas generant material contained within the inflator device. Moreover, in view of the widespread use of such inflator devices, large numbers of gas generant material-containing inflator devices are routinely shipped and transported, such as to various vehicle assembly plants.

The risk of inadvertent reaction of a gas generant material-containing inflator device is generally very small in view of currently applied safety practices.

In the past, gas generant material-containing inflator devices have raised a concern, such as in the event of a fire during the shipping or storage of the devices, that the gas generant material contained within the device would ignite or react to produce or result in the release of gases which could cause a condition of high thrust such that an unrestrained inflator can form or act as a projectile that may create a risk to personnel standing nearby or those trying to put out the fire.

As a result of such possible risk, the United States Department of Transportation requires that inflator devices be subjected to a bonfire test wherein an inflator device even when placed directly in a fire cannot become a projectile upon ignition of the stored gas generant material.

To satisfy such test requirements, inflator manufacturers have developed methods and techniques to balance the gases exiting or discharging from an inflator device to create a "thrust neutral" or "zero thrust" inflator.

One approach has been to design an inflator device to have a plurality of gas discharge holes or openings radially disposed around the circumference of the inflator device. This technique is relatively easy and simple to employ in passenger side inflators and other applications such as where the inflator device is stored in a module housing assembly. For example, many current passenger side airbag module assemblies incorporate inflator devices having inflation gas exit areas, from the inflator device itself or, if used, an associated or included diffuser element, which are dispersed about the inflator device or the associated diffuser to provide or result in 360° gas diffusion to create a device that is thrust neutral.

Moreover, in the past, inertia welding has been a typical or standard welding technique applied to or with inflator device production. Unfortunately, inertia welding typically results in random placement of the discharge openings of the inflator device or, if present, the associated diffuser. The random placement of the discharge openings results in inflators, such as typical disk type inflators, having or providing 360° gas diffusion to ensure thrust neutrality.

One such disk type inflator device is shown in FIG. 1 and generally designated by the reference numeral 20. The inflator device 20 has a generally flat cylindrical shape, sometimes referred to as a "disk" shape, with a plurality of gas discharge holes or openings 22 radially disposed around the circumference of the inflator device. As shown in FIG. 1, the inflator device 20 may include or have joined thereto an attachment collar flange or bracket 24 such as having a plurality of fastener openings 26 disposed thereabout such as to permit the inflator device to be appropriately fastened into place in an associated module housing.

While such 360° gas diffusion can desirably serve to result in a device that is thrust neutral, the use of inflator devices that produce or result in such inflation gas diffusion has frequently necessitated other modification to module assemblies. For example, module assemblies have required the inclusion of rings or deflectors such as to redirect the inflation gas in order to appropriately fill the airbag cushion to provide desired protection to the vehicle occupant.

In practice, such 360° gas diffusion creates at least two additional major concerns for module development. Firstly, the 360° gas diffusion can create severe stresses on the car-forward & car-rearward walls of the passenger airbag module housing. Secondly, the 360° gas diffusion can cause or result severe deformations such that can damage instrument panel components and the cover door over the passenger module housing.

Efforts to address such concerns have included modifying the module housing such as through the inclusion of significant features such as to stiffen the car-forward & car-rearward walls of the passenger airbag module housing such as to prevent this deformation (such deformation being commonly referred to as "bell-mouthing").

Reference is now made to FIGS. 2-5 which illustrate a prior art airbag module assembly 30 including the prior art inflator device 20.

The airbag module assembly 30 includes a generally rectangular module housing 32 having a first pair of opposed walls including a car-forward wall or edge 34 and an opposed car-rearward wall or edge 36 and a second pair of opposed walls including first side wall 40 and a second side wall 42.

The housing 32 also includes a base wall 44 such as having an opening 46 therethrough for placement of the inflator device 20.

The airbag module assembly 30 further includes an appropriately shaped, sized and positioned deflector ring 50 such as forming or including a vertical deflector wall 52 extending about the inflator device 20 such that gas thrust neutrally exiting from the inflator device 20 through the plurality of gas discharge holes or openings 22 is directed vertically out of the housing (such as represented by the arrows 60) such as to appropriately inflate an associated airbag cushion.

As will be appreciated, the need for the inclusion of such added structural features, such as to deflect or redirect the inflation gas and/or to strengthen or modify the module housing such as to prevent this bell-mouthing deformation can significantly increase product cost as well as undesirably increase the weight and size of the module assembly.

Further, such turning of inflation gas to come out of the housing can act to create a column of gas that may undesirably be directly directed towards a vehicle occupant. This can be particularly significant in the event of an out-of-position (OOP) vehicle occupant, such as where an OOP vehicle occupant may be in close proximity to the airbag cushion. In such a situation, if not otherwise addressed, such an assembly operation can create an undesirable risk of injury to an OOP vehicle occupant. Thus, such assembly operation has been commonly addressed via inclusion, either in or with the module and/or otherwise in or by the safety restraint system, of additional countermeasures to minimize and avoid such risk. These countermeasures may, for example, involve a second turning of the inflation gas, such as turn the inflation gas after exiting the module housing.

The inclusion of such countermeasures can also have an undesirable impact on assembly and system size and weight as well as cost.

Thus there is a need and a demand for module assemblies and techniques that can desirably remove the need for turning the inflation gas multiple times during a crash event, yet still be able to satisfy inflator level thrust neutrality requirements for shipping. Further, there is a need and a demand for module assemblies and techniques that reduce the risk of inducing occupant injury in OOP conditions. Yet further, there is a need and a demand for module assemblies and techniques that remove the need for module level content to achieve inflation gas turning and to make the product more efficient. Yet still further, there is a need and a demand for module assemblies and techniques that reduce the need for the use of techniques and inclusion of module features such as added module housing stiffening features and thus can act to improve product features such as package size, weight, etc.

SUMMARY OF THE INVENTION

A general object of the invention is to provide improved inflatable vehicular safety restraint assemblies such as airbag installations for automobiles.

A more specific objective of the invention is to overcome one or more of the problems described above.

One aspect of the invention relates to an airbag module assembly that includes a module housing and a thrust neutral inflator device. The module housing defines a storage chamber. The thrust neutral inflator device is at least in part disposed within the storage chamber such that the inflator device desirably releases airbag inflation gas in a cross-car manner within the storage chamber.

In another aspect of the invention, there is provided an airbag module assembly that includes a module housing, an inflator device and a diffuser. The module housing desirably defines a storage chamber. The inflator device is at least in part disposed within the storage chamber. Upon actuation, the inflator device serves to provide inflation gas to inflate an associated vehicle occupant inflatable restraint device. The diffuser is in inflation gas flow communication with the inflator device. The diffuser includes inflation gas discharge openings on first and second opposed sides thereof to thrust neutrally discharge at least 90% of the inflation gas exiting from the diffuser cross-car within the storage chamber.

In another aspect of the invention, there is provided an airbag module assembly. The airbag module assembly includes a module housing that defines a storage chamber. The module housing has or includes first and second pairs of opposed edges, the first pair of opposed edges includes a car-forward edge and an opposed car-rearward edge, the second pair of opposed edges includes a first lateral side edge and an opposed second lateral side edge.

The module assembly further includes an inflator device at least in part disposed within the storage chamber. The inflator device, upon actuation serves or acts to provide inflation gas to inflate an associated vehicle occupant inflatable restraint device.

The module assembly further includes a diffuser in inflation gas flow communication with the inflator device. The diffuser is centrally positioned between both the first and second pairs of housing opposed edges. The diffuser has or includes inflation gas discharge openings to release inflation gas within the storage chamber at an angle of no more than ±60° from horizontal when viewed in a top planar view of the diffuser within the housing.

As used herein, references to inflators devices that is "thrust neutral" or that releases inflation gas in a "thrust neutral" manner or the like are to be understood to refer to inflator devices that thrust neutrally discharge at least 90%, and, preferably, substantially all, the inflation gas discharged or exiting from the inflator device.

Other objects and advantages will be apparent to those skilled in the art from the following detailed description taken in conjunction with the appended claims and drawings.

DESCRIPTION OF PREFERRED EMBODIMENTS

As detailed further below, the invention generally provides improved inflatable vehicular safety restraint assemblies such as airbag installations for automobiles.

A significant aspect of the invention is the development of inflator devices having discharge openings that are specifically placed, positioned or otherwise appropriately disposed on or about the inflator device or, if present, an associated diffuser to provide or result in desired directional inflation gas discharge without necessarily requiring module inclusion of structural features such as a deflector to turn the inflation gas out of the housing and potentially burning through the cushion material in close proximity to the inflator or the need for inclusion of a feature such as a cushion loop diffuser to turn the inflation gas to the sides (e.g., left and right) in the cushion in the event of an OOP vehicle occupant.

As will be appreciated, in particular in view of the discussion following herein, desired directional inflation gas discharge without necessarily requiring the inclusion of such added features can greatly reduce the deployment loads on the car-forward and car-rearward sides of air bag module housing and thus desirably results in savings on one or more of module packaging, weight and cost. Further, the avoidance of such added features desirably allows or results in increased allowable space between the lateral sides of the housing prior to the inflation gas impinging on the cushion fabric. This increased distance permits or allows for increased or further cooling of inflation gases prior to contacting the associated inflatable restraint device, e.g., airbag cushion fabric.

Figure 2:
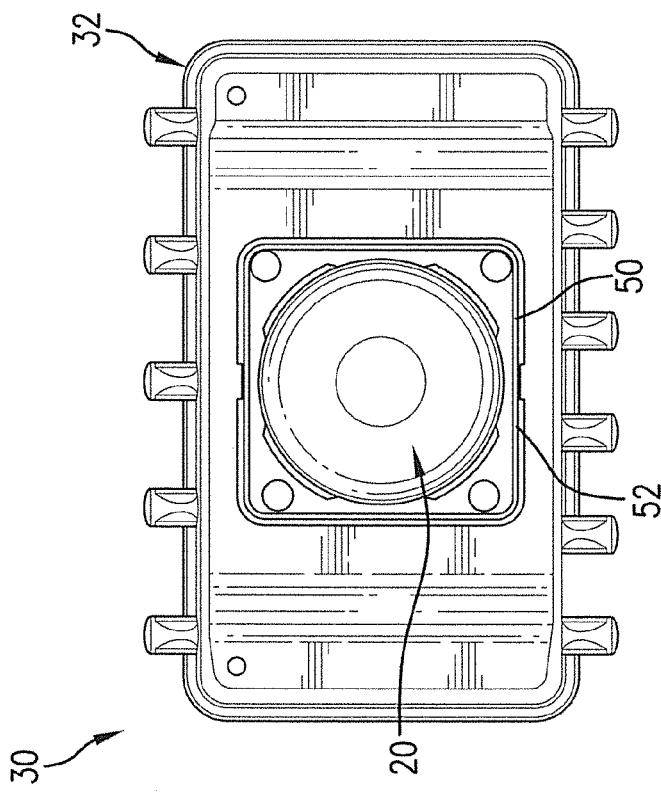
FIG. 2 is a top planar view of a prior art airbag module assembly, including the prior art inflator device shown in FIG. 1.
Figure 1:
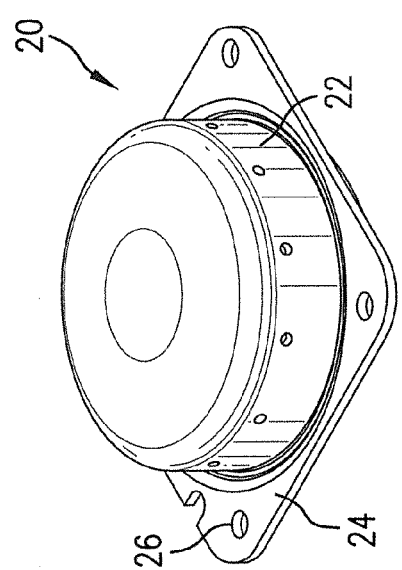
FIG. 1 is a perspective view showing a prior art inflator device.
Figure 3:
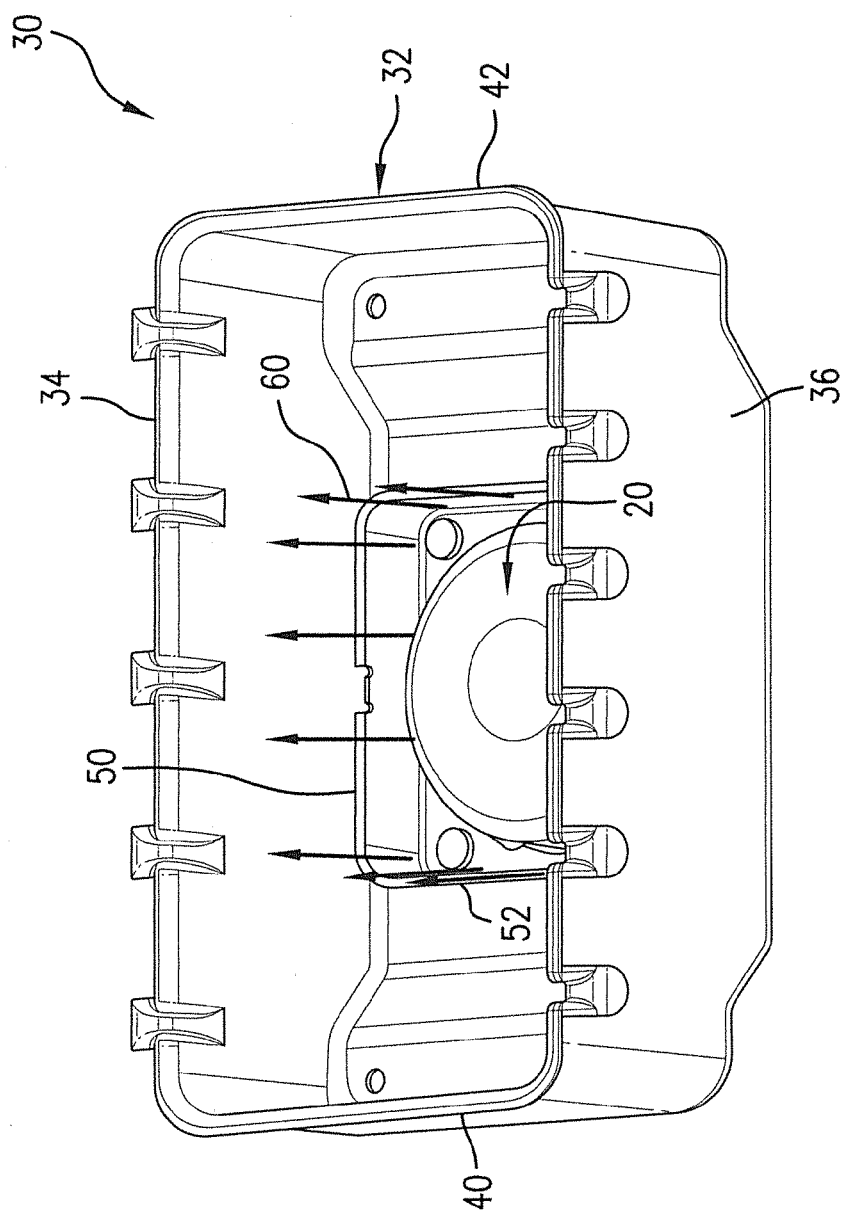
FIG. 3 is a perspective view of the prior art airbag module assembly shown in FIG. 2.
Figure 4:
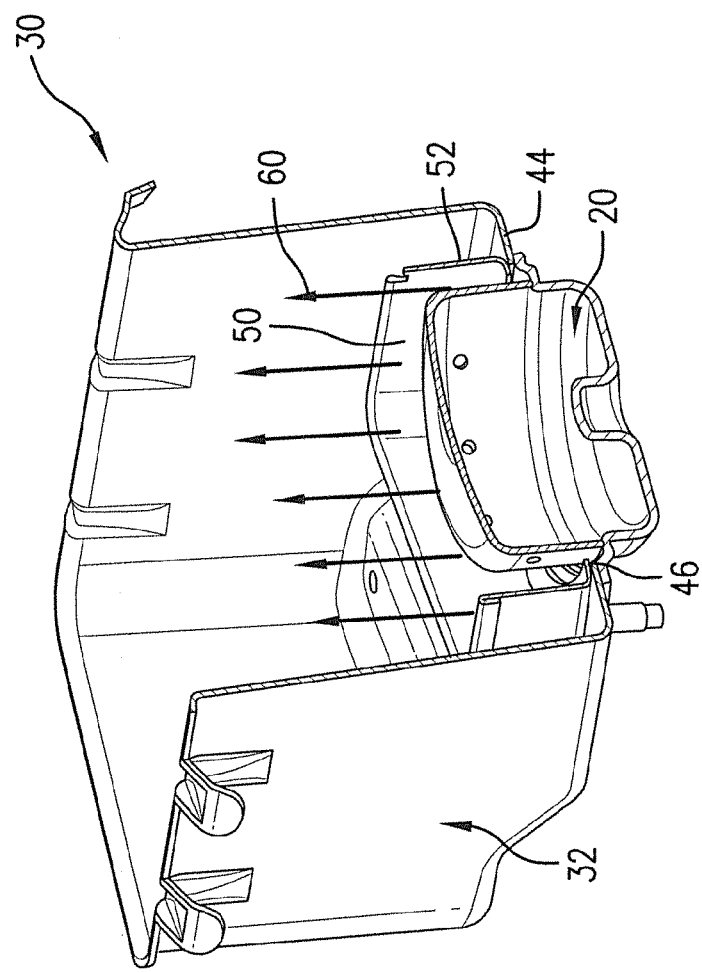
FIG. 4 is a perspective sectional view of the prior art airbag module assembly shown in FIGS. 2 and 3.
Figure 6:
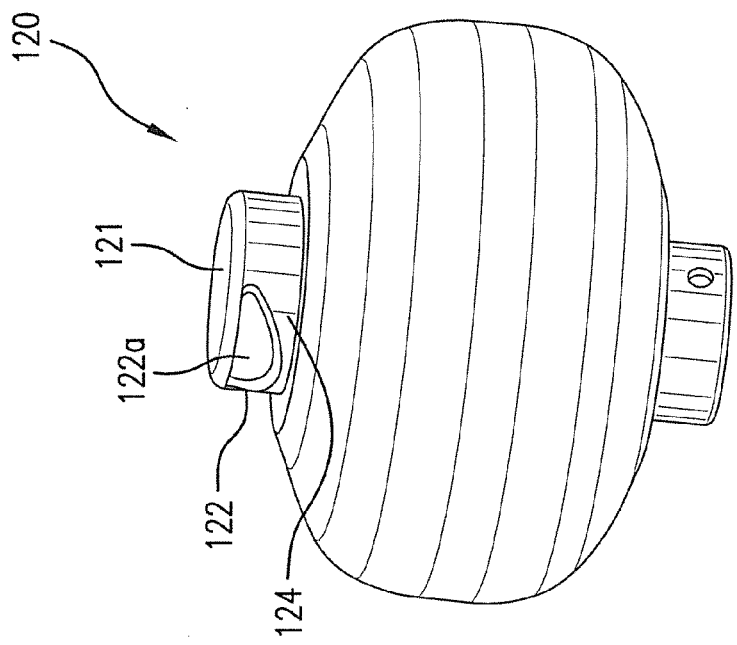
FIG. 6 is a perspective view showing an inflator device in accordance with one aspect of the invention.
Figure 5:
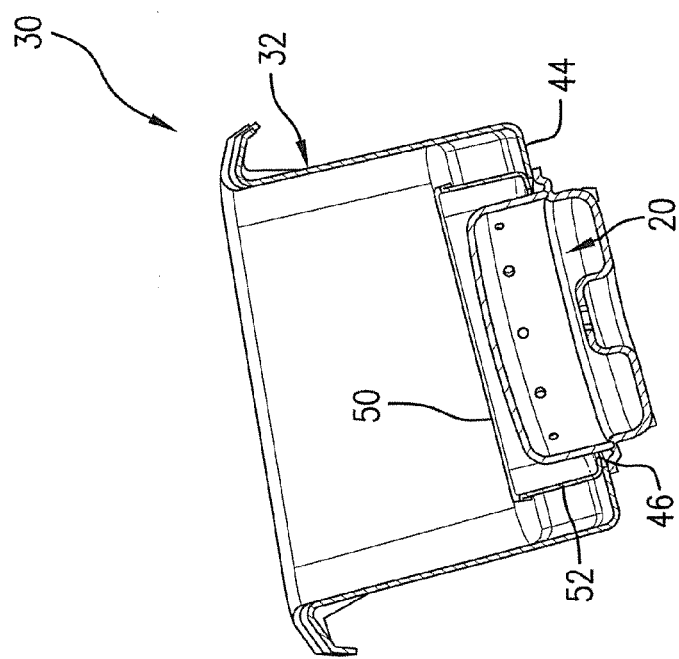
FIG. 5 is a side sectional view of the prior art airbag module assembly shown in FIGS. 2-4.

Turning to FIG. 6 is a perspective view showing an inflator device, generally designated by the reference numeral 120, in accordance with one aspect of the invention. The inflator device 120 has a generally ellipsoid shape.

While the illustrated ellipsoid shape may more specifically be an oblate spheroid shape, those skilled in the art and guided by the teachings herein provided will understand and appreciate that the broader practice of the invention is not necessarily so limited as other ellipsoid shaped inflator devices as well as inflator devices of other shapes can be appropriately utilized in, with or as a part of the invention.

The inflator device 120 includes or has a central diffuser element 121 having inflation gas discharge openings 122 thrust neutrally disposed thereabout in cross-car inflation gas release placement, as further illustrated by reference to FIG. 7.

Figure 7:
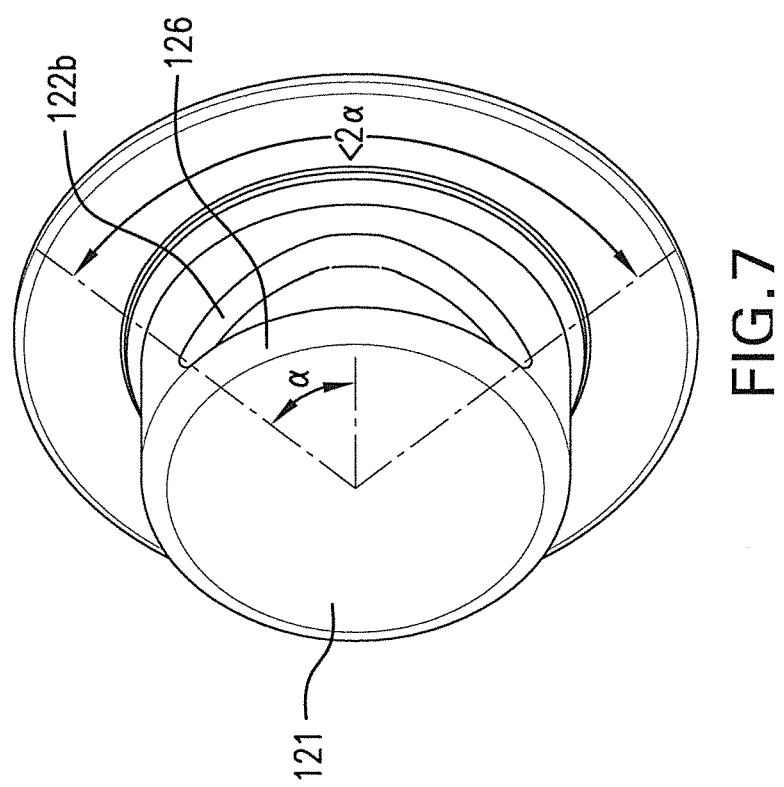
FIG. 7 is an angled top side view of the diffuser element of the inflator device shown in FIG. 6 showing the inflation gas diffusion angle for the discharge openings of the inflator device.

Regarding the thrust neutral placement of the inflation gas discharge openings 122, it is to be appreciated that while FIG. 6 shows inflation gas discharge opening 122a on a first side 124 of the diffuser 121, a similar corresponding inflation gas discharge opening 122b is disposed on the opposite second side 126 of the diffuser 121, as shown in FIG. 7.

Those skilled in the art and guided by the teachings herein provided will further appreciate that while each of the first and second sides 124 and 126 have been shown with a single inflation gas discharge opening, the broader practice of the invention is not necessarily so limited. For example, in alternative embodiments, the area of discharge opening provided on either or both sides can, if desired, be subdivided such as by comprising two or more openings. In some embodiments, such multiple openings can be of the same size or different size, as may be desired for a particular application.

As shown in FIG. 7, the inflation gas discharge openings are desirably disposed at an angle $\pm\alpha$ from horizontal or such as at a total arc of $2\alpha$, where generally $\alpha=60°$ and, preferably, $\alpha=50°$ and such as to provide sought and desired cross-car diffusion of inflation gas produced or resulting from the inflator device 120.

Figure 8:
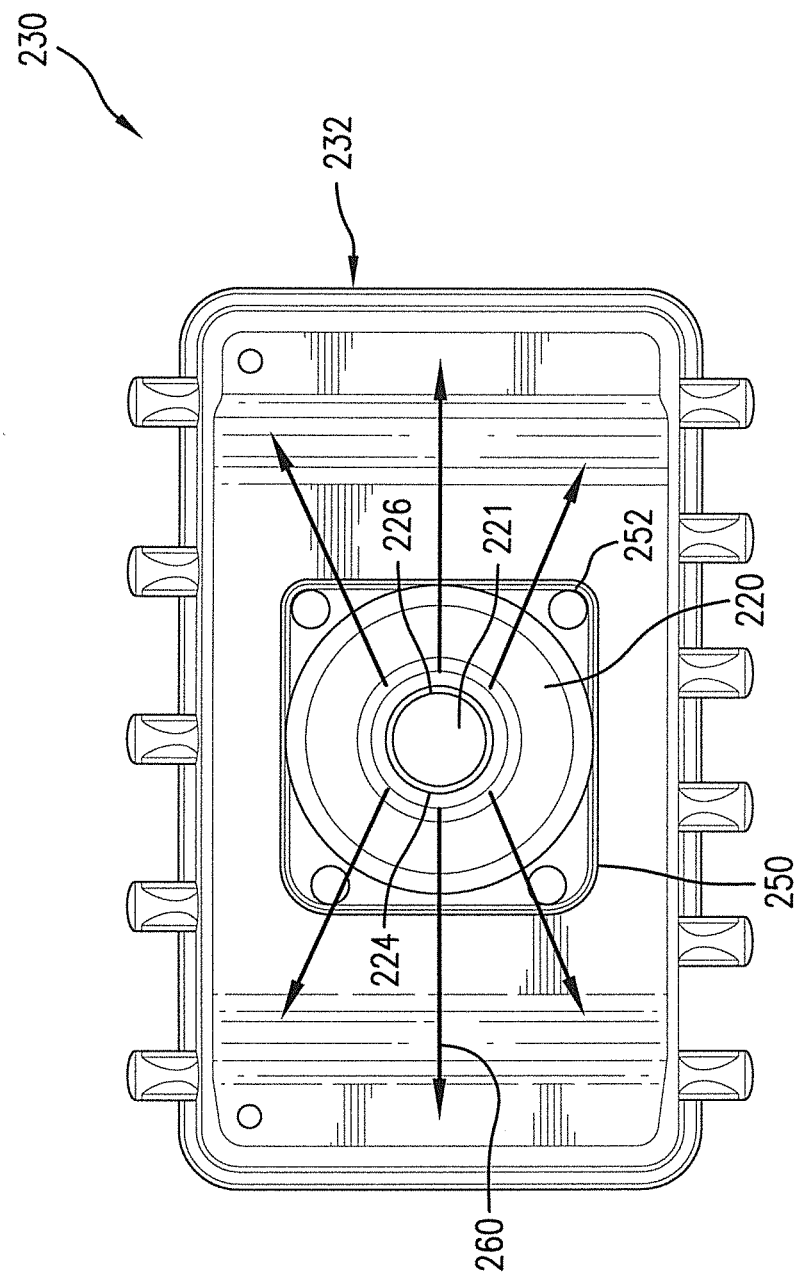
FIG. 8 is a top planar view, similar to FIG. 2, but now showing an airbag module assembly in accordance with one aspect of the invention.
Figure 9:
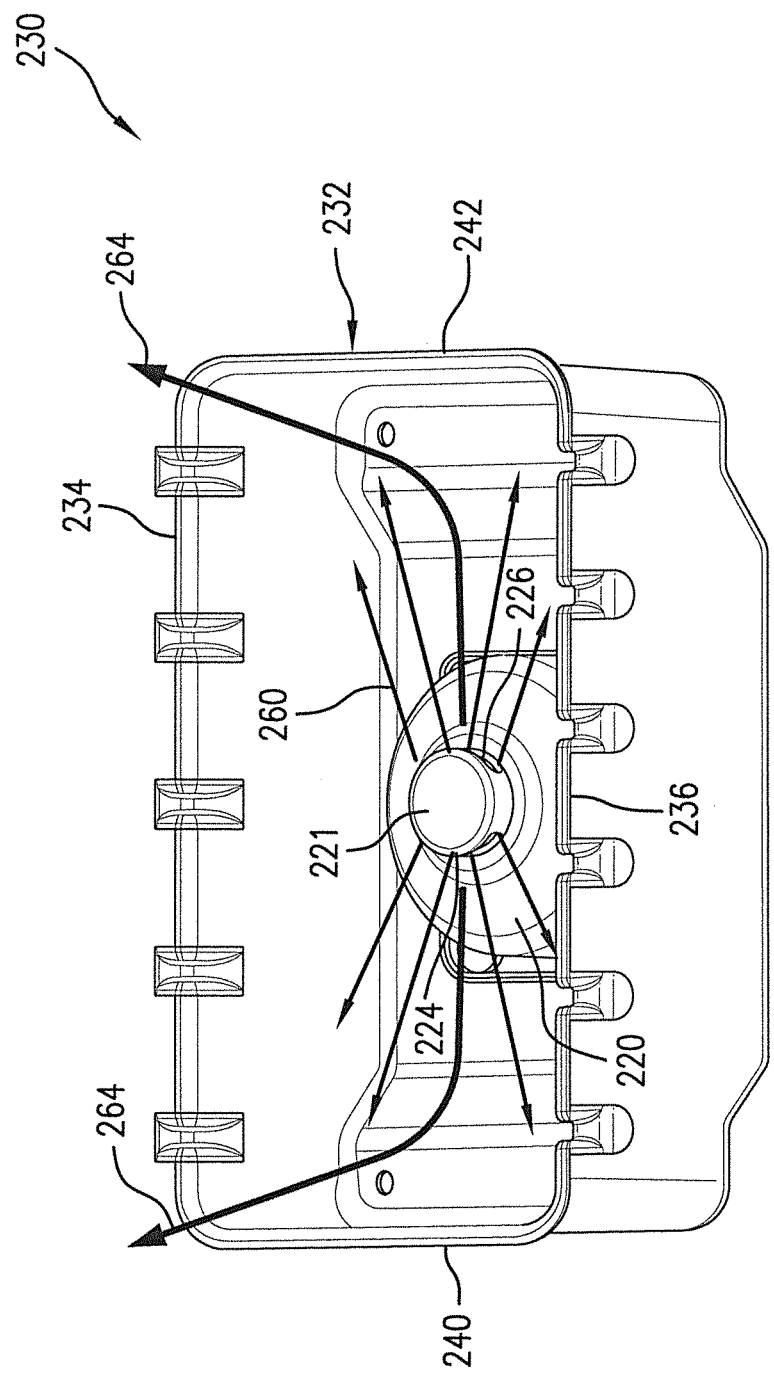
FIG. 9 is a perspective view, similar to FIG. 3, but now showing the airbag module assembly in accordance with one aspect of the invention shown in FIG. 8.
Figure 10:
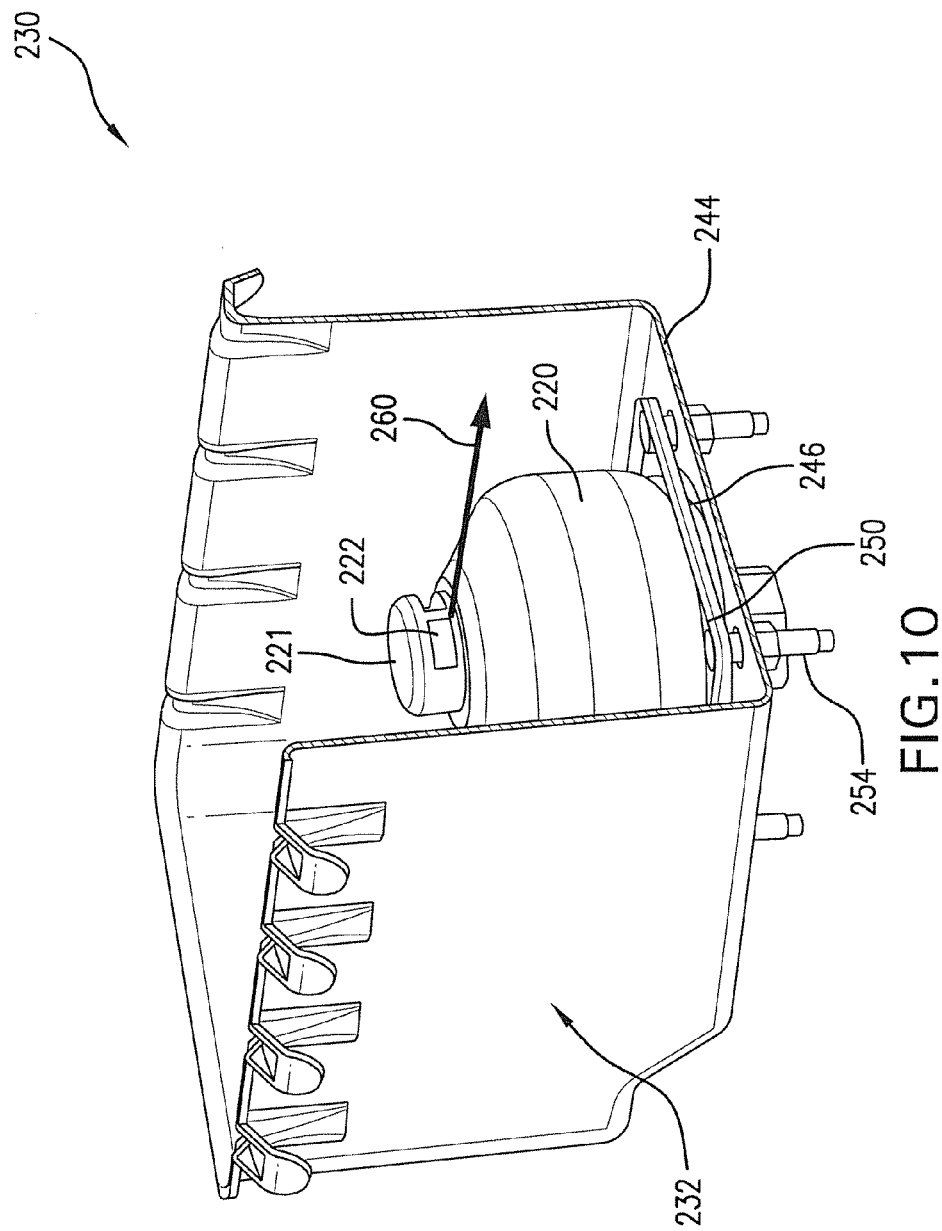
FIG. 10 is a perspective sectional view of the airbag module assembly in accordance with one aspect of the invention shown in FIGS. 8 and 9.

Reference is now made to FIGS. 8-10 which illustrate an airbag module assembly in accordance with one aspect of the invention and generally designated by reference numeral 230 including an inflator device 220 in accordance with one aspect of the invention and similar to the inflator device 120 described above.

Similar to the inflator device 120, the inflator device 220 includes or has a central diffuser element 221 having inflation gas discharge openings 222 thrust neutrally disposed thereabout in cross-car inflation gas release placement. In inflator device 220, however, rather than a single discharge opening disposed on each of the first side 224 and second side 226 of the diffuser 221, the area of discharge opening provided on each side is composed of two similarly sized openings.

The airbag module assembly 230 includes a generally rectangular module housing 232 having a first pair of opposed walls including a car-forward wall or edge 234 and an opposed car-rearward wall or edge 236 and a second pair of opposed walls including first side wall 240 and a second side wall 242.

The housing 232 also includes a base wall 244 such as having an opening 246 therethrough for placement of the inflator device 220.

The airbag module assembly 230 further includes an appropriately shaped, sized and positioned attachment flange, bracket or ring 250 such as having a plurality of fastener openings 252 disposed thereabout such as in respective corners of the bracket 250. As shown, fasteners 254 can be secured through the openings 252 such as to serve to secure the inflator device 220 and/or an associated airbag cushion within the module housing 232. As will be appreciated by those guided by the teachings herein provided, through the use of a thrust neutral inflator device such as herein described and which inflator device diffuses or releases inflation gas in a cross-car manner (e.g., left and right) within the module instead of 360°, the need for a deflector ring to turn the gas out of the housing and avoid potential burning through the airbag cushion material in close proximity to the inflator is effectively eliminated. Thus, the attachment ring 250 at least in part differs from the deflector ring 50 described above in connection with the prior art assembly in that the attachment ring 250 does not include a vertical deflector wall extending about the inflator device such as to vertically gas exiting from the inflator device out of the housing.

In FIGS. 8 and 9, the arrows 260 represent the cross-car discharge or release of inflation gas from the inflator device 220, with the arrows designated by the reference numeral 264 depicting the release of the inflation gas from the housing and ultimately to the airbag cushion. Such cross-car discharge or diffusion of the inflation gas desirably greatly reduces the deployment loads on the car-forward side 234 and car-rearward side 236 of the housing 232. As a result, the need for the inclusion of significant features such as to stiffen the housings on these two sides to prevent this deformation (bell-mouthing) is desirably reduced or eliminated and thus results in significant savings on module packaging, weight and/or cost.

Additionally, the greater allowable space within the housing between left and right sides of the housing before gas impingement upon an airbag cushion fabric desirably acts to allow greater cooling of the inflation gas prior to contacting the fabric. Such a feature can be particularly desirable in the context of module assemblies that include or incorporate inflator devices that produce or form inflation gas in whole or in significant part via an exothermic reaction such as via an exothermic reaction of a pyrotechnic gas generant or via an exothermic reaction of a stored fuel material such that the initially produced or formed inflation gas is at an elevated temperature, as compared to the ambient temperature condition. Thus while the broader practice and use of the invention is not necessarily limited to use with heat-producing or heat-forming inflator devices, at least certain features of the invention appear to have particular desirability or applicability in connection with such heat-producing or heat-forming inflator devices.

Moreover, the subject invention development desirably serves to achieve one or more of the following:
1. removes the need for multiple turning of inflation gas during a crash event, yet still be able to satisfy inflator level thrust neutrality requirements for shipping;
2. removes the need for added module level content to effect such turning, thus making the product more efficient;
3. reduces the risk of inducing occupant injury in an OOP vehicle occupant conditions; and
4. reduces the need for stiffening features in or as a apart of the housing, thus improving one or more of package size, weight, and/or cost.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag module assembly, the assembly comprising:
    a module housing defining a storage chamber, and
    a thrust neutral inflator device at least in part disposed within the storage chamber, the inflator device including an inflator body and having a diffuser extending from the body, wherein airbag inflation gas is cross-car released from the inflator device within the storage chamber, wherein the cross-car release of the airbag inflation gas comprises substantially all the airbag inflation gas being released at an angle of no more than ±60° from horizontal when viewed in a top planar view of the inflator device disposed within the housing.

2. The airbag module assembly of claim 1 wherein the cross-car release of the airbag inflation gas comprises substantially all the airbag inflation gas being released at an angle of no more than ±50° from horizontal when viewed in a top planar view of the inflator device disposed within the housing.

3. The airbag module assembly of claim 1 wherein the diffuser includes gas discharge outlets disposed on opposed first and second sides thereof.

4. The airbag module assembly of claim 1 wherein the module housing comprises first and second pairs of opposed edges, the first pair of opposed edges including a car-forward edge and an opposed car-rearward edge, the second pair of opposed edges including a first lateral side edge and an opposed second lateral side edge.

5. The airbag module assembly of claim 1 wherein the inflator body is ellipsoid-shaped and the diffuser is central axis-extending from the inflator body.

6. The airbag module assembly of claim 5 wherein the ellipsoid-shaped inflator body has an oblate spheroid shape.

7. The airbag module assembly of claim 5 wherein the diffuser has inflation gas discharge openings to release inflation gas within the storage chamber at an angle of no more than ±60° from horizontal when viewed in a top planar view of the diffuser within the housing.

8. The airbag module assembly of claim 7 wherein the module housing comprises first and second pairs of opposed edges, the first pair of opposed edges including a car-forward edge and an opposed car-rearward edge, the second pair of opposed edges including a first lateral side edge and an opposed second lateral side edge.

9. The airbag module assembly of claim 8 wherein the diffuser inflation gas discharge openings release inflation gas within the storage chamber at an angle of no more than ±50° from horizontal when viewed in a top planar view of the diffuser within the housing.

10. An airbag module assembly, the assembly comprising:
    a module housing defining a storage chamber;
    an inflator device at least in part disposed within the storage chamber, the inflator device including an inflator body and having a diffuser extending from the body, the diffuser in inflation gas flow communication with the inflator body, the inflator device to provide inflation gas to inflate an associated vehicle occupant inflatable restraint device; and
    the diffuser including inflation gas discharge openings on first and second opposed sides thereof to thrust neutrally discharge at least 90% of the inflation gas exiting from the diffuser cross-car within the storage chamber.

11. The airbag module assembly of claim 10 wherein the cross-car release of the airbag inflation gas comprises substantially all the airbag inflation gas being released at an angle of no more than ±60° from horizontal when viewed in a top planar view of the inflator device disposed within the housing.

12. The airbag module assembly of claim 10 wherein the cross-car release of the airbag inflation gas comprises substantially all the airbag inflation gas being released at an angle of no more than ±50° from horizontal when viewed in a top planar view of the inflator device disposed within the housing.

13. The airbag module assembly of claim 10 wherein the module housing comprises first and second pairs of opposed edges, the first pair of opposed edges including a car-forward edge and an opposed car-rearward edge, the second pair of opposed edges including a first lateral side edge and an opposed second lateral side edge.

14. The airbag module assembly of claim 10 wherein the inflator body is ellipsoid-shaped and the diffuser is central axis-extending from the inflator body.

15. An airbag module assembly, the assembly comprising:
a module housing defining a storage chamber, the module housing having first and second pairs of opposed edges, the first pair of opposed edges including a car-forward edge and an opposed car-rearward edge, the second pair of opposed edges including a first lateral side edge and an opposed second lateral side edge;
an inflator device at least in part disposed within the storage chamber, the inflator device including an inflator body and having a diffuser extending from the body, the diffuser in inflation gas flow communication with the inflator body, the inflator device to provide inflation gas to inflate an associated vehicle occupant inflatable restraint device; and
the diffuser centrally positioned between both the first and second pairs of housing opposed edges, the diffuser having inflation gas discharge openings to release inflation gas within the storage chamber at an angle of no more than ±60° from horizontal when viewed in a top planar view of the diffuser within the housing.

16. The airbag module assembly of claim 15 wherein the inflation gas discharge openings of the diffuser release inflation gas within the storage chamber at an angle of no more than ±50° from horizontal when viewed in a top planar view of the diffuser within the housing.

17. The airbag module assembly of claim 15 wherein at least 90% of the inflation gas exiting from the diffuser is cross-car thrust neutrally discharged at within the storage chamber.

18. The airbag module assembly of claim 15 wherein the inflator body is ellipsoid-shaped and the diffuser is central axis-extending from the inflator body.

* * * * *